United States Patent [19]

Sugimori et al.

[11] 4,448,537
[45] May 15, 1984

[54] SCREW-TYPE HYDRO-EXTRACTING EXTRUDER

[75] Inventors: Teruhiko Sugimori; Fumio Suzuki; Hideaki Habara, all of Ohtake, Japan

[73] Assignee: Mitsubishi Rayon Co., Ltd., Tokyo, Japan

[21] Appl. No.: 185,930

[22] Filed: Sep. 10, 1980

[30] Foreign Application Priority Data

Sep. 18, 1979 [JP] Japan .............................. 54-128972[U]
Sep. 19, 1979 [JP] Japan .............................. 54-129821[U]

[51] Int. Cl.³ ............................................... B29B 1/06
[52] U.S. Cl. ...................................... 366/75; 100/128; 366/76; 366/144
[58] Field of Search ........................ 366/79, 77, 76, 75, 366/87, 88, 89, 96, 97, 318, 323, 186, 190; 100/117, 126, 127, 129; 425/84, 207, 208

[56] References Cited

U.S. PATENT DOCUMENTS

1,297,901  3/1919  Peerson ................................ 100/128
1,828,968 10/1931  Hiller ................................... 100/128
3,578,740  5/1971  Redding ................................ 425/84

FOREIGN PATENT DOCUMENTS

| 42325 | 2/1888 | Fed. Rep. of Germany ...... 100/128 |
| 300600 | 1/1928 | United Kingdom . |
| 1037384 | 7/1966 | United Kingdom . |
| 1035223 | 7/1966 | United Kingdom . |
| 1163913 | 9/1969 | United Kingdom . |
| 1349052 | 3/1974 | United Kingdom . |
| 1366323 | 9/1974 | United Kingdom . |
| 1083427 | 9/1975 | United Kingdom . |
| 2027605 | 2/1980 | United Kingdom . |

*Primary Examiner*—Robert W. Jenkins
*Attorney, Agent, or Firm*—Cushman, Darby & Cushman

[57] ABSTRACT

A screw-type hydro-extracting extruder comprising a raw material supply zone, a hydro-extracting zone and a heat-melting zone, said hydro-extracting zone is comprised of a plurality of doughnut-shaped plates and a slit is formed between every two adjacent plates.

5 Claims, 9 Drawing Figures

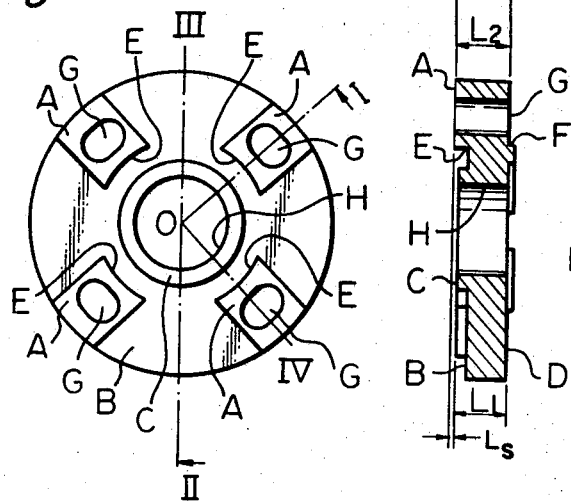
Fig. (1-1)  Fig. (1-2)
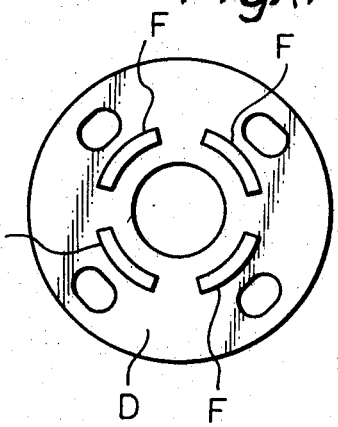
Fig. (1-3)
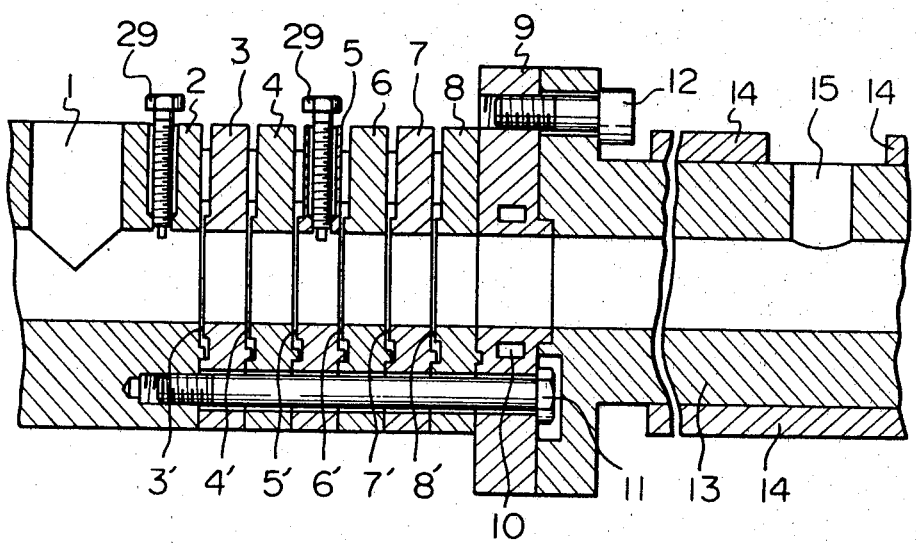
Fig. 2

SCREW-TYPE HYDRO-EXTRACTING EXTRUDER

BACKGROUND OF THE INVENTION

1. Field of the Invention

The present invention relates to a screw-type hydro-extracting extruder which is especially suitable for dehydration of a substance having a relatively low liquid content.

2. Description of the Prior Art

According to conventional techniques, molding of resins containing large quantities of liquid components, such as resins formed by polymerization in the aqueous system, by a screw-type extruder is carried out after the liquid components have been removed by a pneumatic drier or fluid drier. At this drying step, since the liquid components are gasified and removed, the loss of heat is large and thermal deterioration of the resins is promoted. Recently, multi-kind but small-quantity manufacture is carried out with the same apparatus so as to obtain a variety of products from the apparatus and increase the utility value of the apparatus. When the above hydro-extracting technique is applied to this multi-kind but small-quantity manufacturing, it is expected that when one kind of a product is switched over to another kind of a product, contamination is readily caused by a minute amount of the resin left at the drying step, resulting in reduction of the productivity. In the field of rubber industries, compression dehydration has practically been adopted as means for overcoming such disadvantage. However, since the water content in a rubber composition to be dehydrated is ordinarily very high and is about 50%, a large area is required for filtration. Accordingly, there is ordinarily used a two-stage screw system in which compression dehydration is carried out in a first stage, water which is not removed by this compression dehydration is evaporated and removed by a vent mechanism disposed between the first stage and the second stage and melt molding and vulcanization is carried out in the second stage. However, this method is defective in that the structure of the dehydrating zone is complicated and the size of equipment is large. Furthermore, when this compression dehydration method is applied to raw materials having a relatively low water content, such as resins formed by polymerization in the aqueous system, the quantity of extracted water is small and merits as attained in rubber industries can hardly be attained.

SUMMARY OF THE INVENTION

In accordance with the present invention, there is provided a screw-type hydro-extracting extruder comprising a raw material supply zone, a hydro-extracting zone and a heat-melting zone, said hydro-extracting zone includes a plurality of doughnut-shaped plates and a slit is formed between every two adjacent plates. An especially high hydro-extracting efficiency can be attained when a resin having a relatively low water content is processed by the extruder of the present invention.

BRIEF DESCRIPTION OF THE DRAWINGS

FIG. 1-1 is a front view showing one example of the doughnut-shaped plate that is used in the present invention, FIG. 1-2 is a view showing the section taken along the line I-O-II in FIG. 1-1 and FIG. 1-3 is a back view of the plate shown in FIG. 1-1.

FIG. 2 is a sectional side view illustrating main parts of one embodiment of the screw-type hydro-extracting extruder according to the present invention.

FIGS. 3 and 4 are sectional views, corresponding to FIG. 1-2, which illustrate another examples of the plate that is used in the present invention.

In FIGS. 1 to 7, reference numeral 1 represents a raw material supply opening, reference numeral 2 represents a barrel defining the raw material supply zone, reference numerals 3 to 8 represent plates defining the hydro-extracting zone, reference numerals 3' to 8' represent annular slits formed by the plates 3 to 8, reference numeral 9 represents a flange connecting the hydro-extracting zone to the heat-melting zone, reference numeral 10 represents an annular cavity for passing a cooling medium for cooling the flange 9, reference numerals 11 and 12 represent bolts, reference numeral 13 represents a barrel of the heat-melting zone, reference numeral 14 represents a heater, and reference numeral 15 represents a vent opening. Furthermore, reference numeral 16 represents a hole piercing through a plate, reference numeral 17 represents the inner face of the barrel, reference numeral 18 represents the outer face of the barrel, reference numeral 19 and 19' represent bolts, reference numeral 20 represents a female screw portion, reference numeral 21 represents a screw, reference numeral 22 represents a draining labyrinth, reference numeral 23 represents a barrel, reference numeral 24 represents a screw shaft attaching device, reference numeral 25 represents a hopper screw, reference numeral 26 represents a hopper, reference numeral 27 represents a raw material supply opening, reference numeral 28 represents a slit, and reference numeral 29 represents a clogging-preventing pin.

DETAILED DESCRIPTION OF THE PREFERRED EMBODIMENTS

Figure 3:
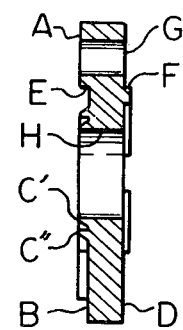

FIG. 1 illustrates one example of the plate that is used in the present invention, and the plate shown in FIG. 1 is specifically used in run 4 of Example 1 given hereinafter. FIG. 2 is a sectional side view illustrating main parts of one embodiment of the screw-type hydro-extracting extruder, which shows the section corresponding to the section taken along the line III-O-IV in FIG. 1-1. Referring to FIG. 1, a plane A is brought into close contact with a plane D of another plate when assembled, to determine the position of the plate in the direction of a screw shaft (not shown). A plane C forms a slit between said plane C and the plane D of another plate when assembled, and a plane B forms a slit between said plane B and the plane D of another plate. Curved faces E and F have substantially the same curvature with the barrel hole central axis O being as the center. These curved faces are not only used for determining the position of the central axis of the plate when the plate is assembled, but also used as guides when the plate is relatively rotated to prevent clogging of the slit. A long hole G is formed for insertion of a bolt 11 shown in FIG. 2. Symbol H indicates the inner face of the barrel.

In FIG. 2, reference numerals 1 and 2 represent a raw material supply opening and a barrel defining the raw material supply zone, respectively. Plates 3 to 8 are disposed to construct the hydro-extracting zone, and slits 3' to 8' are formed by the plates 3 to 8. A flange 9 is formed to connect the hydro-extracting zone to the heat-melting zone. Reference numeral 10 represents an annular cavity for passing a cooling medium for cooling the flange, to which the cooling medium is supplied through a pair of pipes (not shown). A bolt 11 is disposed to fix the plates 3 to 9 to the barrel 2 of the raw material supply zone. Reference numerals 13 and 14 represent a barrel of the heat-melting zone and a heater of the heat-melting zone, respectively. Furthermore, reference numerals 15 and 29 represent a vent opening and a clogging-preventing pin, respectively.

In the plate shown in FIG. 3, planes C' and C'' correspond to the plane C in FIG. 1. If the plane C is thus divided into two planes C' and C'', each having an extremely narrowed width, solid-liquid separation can be accomplished highly assuredly.

Figure 4:
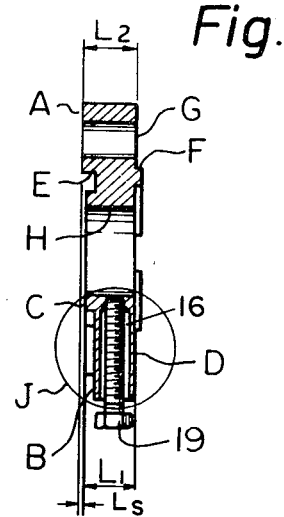
Figure 5:
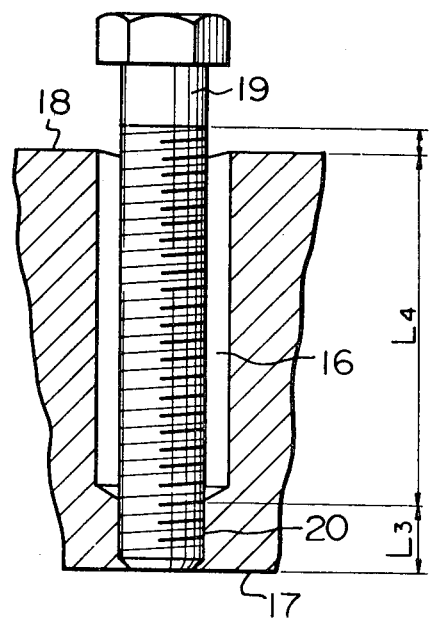
FIG. 5 is an enlarged view showing the longitudinal section of the zone J in FIG. 4.

The plate shown in FIG. 4 is a modification of the plate shown in FIG. 1, in which a plurality of holes 16 are formed to pierce through the peripheral wall, as illustrated in detail in FIG. 5. In this plate, a female screw is formed in the portion L3 of the hole 16 on the side of the inner face 17 of the barrel, and a bolt 19 is detachably inserted in this female screw from the side of the outer face 18 of the barrel so that a clearance is formed between the female screw and the bolt 19. The inner diameter of the portion L4 of the hole 16 on the side of the outer face 18 of the barrel is larger than the outer diameter of the bolt 19. Accordingly, the liquid component is discharged outside the barrel through the clearance between the female screw and the bolt 19 and also through a slit formed between the portion L4 of the hole 16 and the bolt 19 in this portion L4.

Figure 6:
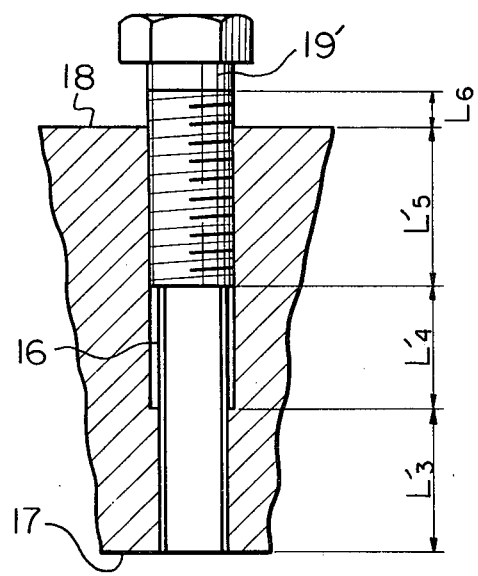
FIG. 6 is an enlarged view showing the longitudinal section of another example of the zone J in FIG. 4.

FIG. 6 is an enlarged view showing the longitudinal section of another example of the zone J in FIG. 4. In the example shown in FIG. 6, only the upper portion (L'5 plus L6) of the bolt 19' and the upper portion (L'4 plus L'5) of the hole 16 are threaded and the bolt 19' is screwed and inserted into the hole 16. The screw portion of the bolt 19' is partially scratched off in the direction of the screw axis. In this plate, the liquid component squeezed out from the raw material in the barrel is discharged outside the barrel through an annular slit formed between the lower portion (L'3 plus L'4) of the bolt 19' and the hole 16 and through a slit defined by the screw scratch-off portion of the bolt 19' and the hole 16.

Figure 7:
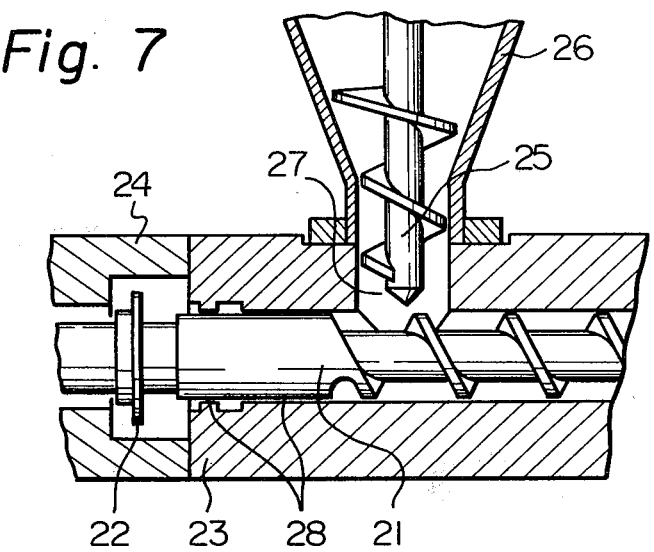
FIG. 7 is a sectional side view illustrating main parts in an embodiment in which an auxiliary hydro-extracting zone is formed intermediately between a raw material supply zone and a screw-driving zone.

FIG. 7 is a sectional side view illustrating main parts in an embodiment where an auxiliary hydro-extracting zone is formed intermediately between a raw material supply zone and a screw-driving zone. In this embodiment, the liquid component is discharged through a slit formed between the inner face of a barrel 23 and the outer face of a screw 21 in a zone intermediate between a zone for driving the screw 21 and a raw material supply zone. A draining labyrinth 22 is provided to prevent the discharged liquid component from introducing into the screw-driving zone.

In the raw material supply zone, the content of the liquid component is extremely increased in the raw material. Accordingly, a raw material-transporting screw 25 is disposed in a hopper 26 to ensure constant-rate supply. In this embodiment, the pressure for compressing and squeezing the raw material can be changed by adjusting the rotation numbers of the screws 25 and 21, whereby the content of the liquid component in the raw material coming from the compressing zone can be adjusted.

In the extruder according to the present invention, a plurality of plates as shown in FIGS. 1, 3 and 4 are assembled to construct the hydro-extracting zone, and solid-liquid separation is accomplished through slits defined by planes C and D of the plates and, if necessary, through slits shown in FIGS. 5 and 6. In order to effect this solid-liquid separation through the slits at a high efficiency, it is necessary to adjust the clearance and length of the slits so as to minimize leakage of the solid component from the slits while preventing clogging of the slits. In the extruder according to the present invention, the slit clearance Ls can be obtained by making the distance L1 between the planes C and D a little smaller than the distance L2 between the planes A and D in FIG. 1 (the relation of Ls=L2−L1 is established). Furthermore, the slit clearance can be set by interposing a spacer between the planes D and A when the cylinder is assembled or according to the spacing between the female screw and the bolt in case of the slit shown in FIG. 5 or according to the outer diameter of the lower portion (L'3 plus L'4) of the bolt 19' and the inner diameter 16 in case of the slit shown in FIG. 6. Prevention of clogging of the slit is effectively accomplished by removing the powdery solid present in the slit by relative rotation movements of the two plates forming the slit between the planes C and D in FIG. 1 or by rotation of the bolts 19 and 19' in the slits shown in FIGS. 5 and 6. This operation may be performed intermittently at certain intervals, and incorporation of the powdery solid into the extracted liquid can be remarkably reduced by this operation. Since the curved faces E and F formed on the two plates have substantially the same curvature and are engaged with each other with a slit between them, the rotation movements of these plates can be performed very smoothly with the central axis O being as the center of rotation.

When the content of the liquid component in the raw material is high, a large area is necessary for filtration, and in this case, if the hydro-extracting zone is located between the raw material supply zone and the heat-melting zone, the length of the extruder is considerably increased and a problem readily arises as regards the strength of the screw. In contrast, when the content of the liquid component is low, the filtration area can be reduced and the length of the hydro-extracting zone can be shortened, and in this case, the entire length of the extruder is not substantially different from that of an ordinary extruder.

According to the present invention, effects that cannot be attained by the conventional compression dehydration can be attained if the hydro-extracting zone is disposed between the raw material supply zone and heat-melting zone of the screw-type extruder. More specifically, in case of compression dehydration, the amount of the liquid component contained in the raw material cannot be reduced to zero under a practical compression pressure, and the remaining liquid component should be gasified by heating and removed from the vent zone or the like. Also in the extruder of the present invention, a vent zone is ordinarily disposed downstream of the heat-melting zone to remove the residual liquid component. In the extruder of the present invention, however, since the liquid component is removed from the hydro-extracting zone in an amount much larger than the amount of the liquid component removed by the conventional compression hydration, the amount of the liquid component gasified and removed from the vent zone can remarkably be reduced. Various reasons may be considered for this phenomenon. However, it is considered that the main reason may be that a part of the liquid component gasified in the heat-melting zone flows back to the hydro-extracting zone and is then condensed by contact with the newly fed raw material maintained at a relatively low temperature and the liquid formed by this condensation is removed from the hydro-extracting zone. In short, the extruder of the present invention can be regarded as including therein a certain kind of a heat exchange mechanism, and therefore, the thermal loss by gasification of the liquid component can remarkably be reduced in the extruder of the present invention.

Furthermore, in the extruder of the present invention, since the content of the liquid component in the resin introduced into the vent zone is low, expansion of the volume by bubbling of the liquid component is reduced and troubles such as vent-up are hardly caused to occur, and an extrusion rate similar to the extrusion rate attainable in an ordinary screw-type extruder having the same screw diameter can be obtained. Furthermore, as described in detail hereinafter, the size of the extruder can be diminished by simplification of the structure of the hydro-extracting zone, and if the size of the extruder of the present invention is similar to the size of an ordinary screw-type extruder ordinarily used in the conventional process, both the drying step and the melt-molding step of the conventional process can also be performed by the extruder of the present invention. Therefore, if the extruder of the present invention is adopted, there can be attained various industrial advantages such as simplification of the process, increase of productivity, reduction of equipment investment, reduction of the thermal loss and attainment of a high energy-saving effect. Furthermore, the heat history of the resin is remarkably reduced as compared with the heat history of the resin treated in the conventional process including the drying step, and therefore, a high improvement of the quality of the product can be expected.

The extruder of the present invention has various inherent advantages such as mentioned above, and when known techniques are applied to the extruder of the present invention, the operation stability and operation efficiency can further be enhanced.

For example, if the depth of the screw groove is gradually shallowed according to the known technique, the supplied resin is effectively compressed and squeezed, with the result that the efficiency of dehydration in the hydro-extracting zone can be enhanced. If the compression pressure exceeds a certain level, the dehydration ratio is hardly changed, though this critical pressure differs to some extent according to the kind, shape and properties of the resin. Therefore, it is not preferred to elevate the compression pressure beyond this critical level, if dehydration alone is taken into account.

In some case, the raw material is formed into a continuous body by compression and squeezing and this continuous body turns together with the screw. In this case, clogging is readily caused. Occurrence of this undesirable phenomenon can effectively be prevented by forming notches on screw flights of the raw material supply zone and the compression zone and inserting pins into locations corresponding these notches.

In the case where a sufficient length is not given to the hydro-extracting zone, the insufficiency of the length can be compensated, for example, by adoption of a method in which an auxiliary hydro-extracting zone is provided in the raw material supply zone or hopper or a method in which a screw-exposed zone is formed between the raw material supply zone and the screw-driving zone and the liquid component leaking from this screw-exposed zone is discharged from the system of the extruder.

In this case, it sometimes happens that the content of the liquid component in the resin is drastically increased and stable supply of the raw material becomes difficult. In order to avoid this disadvantage, it is preferred that a screw be mounted on the hopper for stirring or transporting powders so that a sufficient amount of the raw material can be introduced, to be sure, into the raw material supply zone. Furthermore, the hydro-extracting capacity of the hydro-extracting zone can be increased, by reducing the pressure in the peripheral portion of the hydro-extracting zone so that the pressure on the slits of the hydro-extracting zone on the side of the outer face of the barrel becomes lower than the pressure on the slits of the hydro-extracting zone on the side of the inner face of the barrel. Moreover, if there is adopted a method in which a compressed gas is applied to the hopper, the gas is jetted to the outside of the extruder system through slits formed in the hydro-extracting zone and the liquid component is discharged together with this jetted gas, the capacity of the hydro-extracting zone can be increased and clogging of slits, such as described hereinafter, can be prevented.

In order to reduce the hydro-extracting load imposed on the extruder of the present invention, it is preferred to use a centrifugal dehydrator or other hydro-extracting means for reducing the amount of the liquid component contained in the raw material.

In the compression hydro-extracting apparatus ordinarily used in the field of rubber industries, solid-liquid separation is accomplished through slits. In many cases, these slits are provided on a plane surrounding the screw shaft, and the strength of the plane, that is, slit-forming member is low and this member is reinforced by other member, with the result that the size of the apparatus is inevitably increased. In contrast, in the extruder of the present invention, since a slit is formed between doughnut-shaped plates, that is, the slit is defined by 2 planes vertical to the screw shaft, the strength resisting elevation of the pressure by compression and squeezing of the raw material is very high and any reinforcing member need not be disposed. Therefore, the size of the extruder can be diminished.

When the raw material comprises a very fine powder, the slits are readily clogged, resulting in reduction of the hydro-extracting capacity of the hydro-extracting zone. Occurrence of clogging of the slits may be prevented by adjusting the clearance and length of the slits and removing a part of the raw material together with the liquid component. In this case, there is caused an undesirable phenomenon of incorporation of the powder into the removed liquid component. In the extruder of the present invention, since the members defining slits have a doughnut-like shape, even if slits are designed so that they are clogged, only by rotating the doughnut-shaped members relatively to each other, the powdery material clogging the slits can effectively be removed, and reduction of the capacity of the hydro-extracting zone can be prevented. It is sufficient if this operation is carried out only intermittently, and therefore, incorporation of the resin component into the removed liquid component can remarkably be reduced.

Furthermore, if additional slits are formed by holes piercing through the doughnut-shaped plate (inner and outer faces of the barrel) and rods or pins having a diameter smaller than that of the holes, clogging of the slits can advantageously be prevented very simply by moving the rods or pins in the holes in the direction of the central axis of the rods or pins or by rotating the rods or pins around said central axis.

When a slit is formed by a female screw formed on the barrel and a male screw fitted and inserted in said female screw, the material clogging the slit can be removed by turning said male screw.

Even if clogging-preventing means such as mentioned above is disposed, when the temperature of the hydro-extracting zone is excessively elevated, the clogging powdery resin is molten and formed into a film which completely clogs the hydro-extracting zone, and this clogging material can hardly be removed by the above-mentioned clogging-preventing means. Occurrence of this undesirable phenomenon can effectively be prevented by preventing elevation of the temperature of the hydro-extracting zone by disposing a cooling mechanism between the heat-melting zone and the hydro-extracting zone and/or disposing a cooling mechanism in the hydro-extracting zone. The thermal loss caused by this cooling is not larger than the thermal loss by cooling of the raw material zone in the lower portion of the hopper in the conventional screw-type extruder.

The present invention will now be described in detail with reference to the following Examples that by no means limit the scope of the invention. In these Examples, an extruder of the type shown in FIG. 2 was used.

EXAMPLE 1

An ABS resin having a water content of about 15% was extruded by a hydro-extracting extruder having dimensions shown in Table 1. The structure of the hydro-extracting zone of this extruder was as illustrated in Table 2.

Extrusion conditions adopted in respective runs were as shown in Table 3. In each run, in order to prevent clogging of the hydro-extracting zone with the starting polymer powder, pins were inserted from the barrel at points of 4 pitches and 5.5 pitches from the base of the screw.

TABLE 1

| Inner Diameter of Extruder | 30 mm |
|---|---|
| Channel Depth | |
| Raw material supply zone | 3 mm |
| Hydro-extracting zone | 3–1.5 mm |
| Heat-melting zone | 1.5–1.0 mm |
| Vent zone | 7 mm |
| Length | |
| Raw material supply zone | 3 pitches* |
| Hydro-extracting zone | 5 pitches |
| Heat-melting zone | 5 pitches |
| Vent zone | 5 pitches |

*1 pitch = 30 mm

TABLE 2

| Run No. | Hydro-Extracting Zone | Cooling Zone | Clogging of Hydro-Extracting Zone | Leakage of Starting Polymer |
|---|---|---|---|---|
| 1 | 5 slits (slit width = 0.2 mm, slit length = 2 mm) | not disposed | clogged after 2 hours | no substantial leakage |
| 2 | 5 slits (slit width = 0.2 mm, slit length = 2 mm) | disposed | clogged after 8 hours | no substantial leakage |
| 3 | 5 slits (slit width = 0.4 mm, slit length = 2 mm) | disposed | not caused | leakage of slurry |
| 4 | 5 slits (slit width = 0.4 mm, slit length = 5 mm) | disposed | clogged after 10 hours | no substantial leakage |
| 5 | 5 slits (same as in run No. 4), 16 bolts (screw thread designation of M6, screw length = 10 mm) | disposed | not caused | no substantial leakage |
| 6 | 5 slits (same as in run No. 4), 16 rods (hole diameter = 6 mm, rod diameter = 5.8 mm, rod length = 15 mm) | disposed | not caused | no substantial leakage |

TABLE 3

| Screw Rotation Number | 40 r.p.m. |
|---|---|
| Barrel Temperature | |
| Hydro-extracting zone | 60° C. |
| Heat-melting zone | 195° C. |
| Vent zone | 220° C. |
| Extrusion Rate | about 3.9 to about 4.1 Kg/hour |
| Power Consumption of Screw | 700 to 800 W (net) |

In run 1 where the cooling zone was not disposed between the hydro-extracting zone and the heat-melting zone, the slits were clogged with a filmy polymer when about 2 hours had passed from the start of the operation, and continuation of the operation became impossible. In contrast, in run 2 where the cooling zone was disposed, clogging of the slits was considerably moderated. In runs 1 to 4 where slits as shown in FIG. 1 were used, the slit-defining members were fixed and no relative movement of these members for preventing clogging of the slits was performed. Even under these conditions, in run 3 where relatively loose slits were formed, clogging of the slits was not caused, but a large quantity of the starting polymer powder was incorporated into the extracted liquid. In run 5, slits as shown in FIG. 4 were formed, and in run 6, rods were used instead of the bolts. In each of runs 5 and 6, the bolts or rods were rotated at intervals of 15 to 30 minutes for preventing clogging in the hydro-extracting zone. In these runs 5 and 6, clogging was not caused in the hydro-cracking zone.

In each of runs 1 through 8, bubbles were not included in the extrudate and satisfactory pellets were obtained.

The material balance at the extrusion step in run 6 was determined to obtain the results shown in Table 4. For comparison, the same resin material was compressed and dehydrated at room temperature by a hydraulic press. The obtained results are shown in Table 5. By compression dehydration at room temperature, the water content of the polymer could not be reduced below 10%. In contrast, in run 6 of this Example occording to the present invention, the amount of water removed from the hydro-extracting zone corresponded to 11% based on the starting polymer. Thus, it was confirmed that a high hydro-extracting efficiency can be attained by the hydro-extracting extruder of the present invention.

TABLE 4

| | |
|---|---|
| Water Content in Starting Polymer | 15% |
| Extrusion Rate | 650 g/10 minutes |
| Amount of Water Removed from Hydro-Extracting Zone | 72 g/10 minutes (about 11% based on starting polymer) |
| Amount of Water Evaporated in Vent Zone | 24 g/10 minutes (about 4% based on starting polymer) |

TABLE 5

| Compression Pressure (Kg/cm$^2$) | Water Content (%) |
|---|---|
| 100 | 12 |
| 200 | 11 |
| 500 | 11.5 |
| 1,000 | 10.5 |

EXAMPLE 2

A methacrylic resin having a water content of about 6% was molded into pellets by using a hydro-extracting extruder. The inner diameter of the extruder was 50 mm, and slits and bolts (48 bolts; screw thread designation of M8, screw length of 2 mm) were provided in the hydro-extracting zone of the extruder. The extrusion conditions were as shown in Table 6.

No bubbles were contained in the extrudate, and high-quality pellets comparable or superior to the conventional products were obtained.

TABLE 6

| | |
|---|---|
| Screw Rotation Number | 60 r.p.m. |
| Barrel Temperature | |
| Hydro-extracting zone | 60° C. |
| Heat-melting zone | 220° C. |
| Vent zone | 230° C. |
| Extrusion Rate | 24 Kg/hour |
| Dehydration Rate in Hydro-Extracting Zone | 0.773 Kg/hour |

EXAMPLE 3

The extrusion operation was carried out under the same conditions as in Example 1 except that slits as shown in FIG. 3 were formed in the hydro-extracting zone. When the slit clearance was narrowed to about 0.1 mm, leakage of the starting polymer could remarkably be reduced. Furthermore, since the slit length was short, clogging of the slits was hardly caused.

EXAMPLE 4

The extrusion operation was carried out under the same conditions as in run 2 of Example 1. The hopper and the driving shaft side of the raw material supply zone in the extruder were sealed, and compressed air was applied under a gauge pressure of 1.0 Kg/cm$^2$ to the hopper and was jetted from the hydro-extracting zone. The removed liquid was jetted together with air, and clogging was not caused in the hydro-extracting zone for 10 hours from the start of the operation of the extruder but incorporation of a small amount of the polymer powder into the removed liquid was observed.

EXAMPLE 5

Powder transportation test using the same polymer as used in Example 1 was carried out by using only the hydro-extracting zone used in run 5 of Example 1. In run A, clogging-preventing pins were used, but in run B, these pins were not used. The screw rotation number was adjusted to 40 r.p.m. and the extrusion rate (the amount of the dry polymer extruded) was measured in each run. It was found that in run A, the extrusion rate was 65 to 70 g/min (68 g/min on the average) but in run B, the extrusion rate was 40 to 68 g/min (50 g/min on the average). In short, in run B, the extrusion unevenness was great and the average extrusion rate was small.

What is claimed is:

1. A hydro-extracting extruder for dehydrating a solid material having a predetermined liquid component, said extractor of the type including means defining an extrusion chamber and material supply means in communication with said chamber for supplying a predetermined quantity of said material to said chamber, wherein the improvement comprises:
    means defining a hydro-extracting zone downstream of said material supply means, said hydro-extracting zone means comprising a plurality of plate members each of which includes means defining a cavity for axially communicating with said chamber, a front face having a predetermined number of first raised portions and a back face having a predetermined number of second raised portions, said first and second raised portions arranged so that each cooperates with second raised portions and first raised portions, respectively, of immediately adjacent plate members so that between a predetermined plate member and adjacent ones thereto, a space is defined through which a portion of said liquid component will pass, thereby at least partially dehydrating said material; and
    means defining a material heating zone downstream of said hydro-extracting zone means for substantially removing residual liquid remaining in said material including heater means for transmitting heat energy to said material thereby substantially changing said liquid to a gaseous state, and vent means for venting said gas; and
    connecting means for connecting said hydro-extracting zone means to said heating zone means.

2. An extractor as in claim 1 wherein predetermined ones of said plate members further include aperture means defining an aperture radially extending from said cavity between said front and back faces, and stud means cooperating with said aperture means to define between the surfaces of each a path of egress for a portion of said liquid component.

3. An extractor as in claim 1 or 2 further comprising rotatable extractor means disposed in a portion of said chamber and defining between said chamber portion and said extractor means a space through which a portion of said liquid component will exit, and means defining a recess in communication with said space so that said liquid component can be drained therein thereby preventing interference with said extractor means.

4. An extruder as in claim 1 wherein said plate members further include means for removing accumulated material in said space.

5. An extruder as in claim 4 wherein said removing means includes cooperating arcuate surfaces formed on said first and second raised portions so that relative rotational movement of adjacent plate members will release said accumulated material.

* * * * *